United States Patent
Basset et al.

(10) Patent No.: US 9,939,628 B2
(45) Date of Patent: Apr. 10, 2018

(54) IMAGING SYSTEM

(71) Applicant: CSEM CENTRE SUISSE D'ELECTRONIQUE ET DE MICROTECHNIQUE SA—RECHERCHE ET DÉVELOPPEMENT, Neuchâtel (CH)

(72) Inventors: Guillaume Basset, Huningue (FR); Benjamin Gallinet, Muttenz (CH); Bruno Satilmis, Reinach (CH)

(73) Assignee: CSEM CENTRE SUISSE D'ELECTRONIQUE ET DE MICROTECHNIQUE SA—RECHERCHE ET DÉVELOPPEMENT, Neuchâtel (CH)

( * ) Notice: Subject to any disclaimer, the term of this patent is extended or adjusted under 35 U.S.C. 154(b) by 0 days.

(21) Appl. No.: 15/126,969

(22) PCT Filed: Mar. 20, 2014

(86) PCT No.: PCT/EP2014/055656
§ 371 (c)(1),
(2) Date: Sep. 16, 2016

(87) PCT Pub. No.: WO2015/139761
PCT Pub. Date: Sep. 24, 2015

(65) Prior Publication Data
US 2017/0205618 A1  Jul. 20, 2017

(51) Int. Cl.
G02B 23/24 (2006.01)
F21V 8/00 (2006.01)

(52) U.S. Cl.
CPC ....... *G02B 23/2461* (2013.01); *G02B 6/0016* (2013.01); *G02B 6/0036* (2013.01); *G02B 23/2423* (2013.01)

(58) Field of Classification Search
CPC ........... G02B 23/2461; G02B 23/2423; G02B 6/0016; G02B 6/0036
See application file for complete search history.

(56) References Cited

U.S. PATENT DOCUMENTS 5,471,455 A * 11/1995 Jabr ................ G11B 7/005
369/109.02
5,856,842 A * 1/1999 Tedesco ............. H04N 7/144
348/14.01

(Continued)

FOREIGN PATENT DOCUMENTS

EP  2 662 851 A1  11/2013
GB  2 260 203 A   4/1993

(Continued)

OTHER PUBLICATIONS

Teruhiro Shiono and Hisahito Ogawa, "Planar-optic-disk pickup with diffractive micro-optics," Appl. Opt. 33, 7350-7355 (1994).*

(Continued)

*Primary Examiner* — Peter Radkowski
(74) *Attorney, Agent, or Firm* — Christensen O'Connor Johnson Kindness PLLC

(57) ABSTRACT

An imaging system suitable to provide an image of a surface portion of an object is disclosed. The system includes a light source arranged to provide a light beam, at least a first optical waveguide having a first face and having a second face opposite to the first face, the first face having an incoupling surface. The optical waveguide includes an outcoupling surface, a first diffraction grating arranged on the optical waveguide, and an imaging subsystem arranged to the outcoupling surface. The first diffraction grating is arranged to outcouple at least a fraction of the light beam.

16 Claims, 6 Drawing Sheets

(56) References Cited

U.S. PATENT DOCUMENTS

| | | | | |
|---|---|---|---|---|
| 6,121,603 | A * | 9/2000 | Hang | G02B 21/0032 250/201.3 |
| 7,418,170 | B2 * | 8/2008 | Mukawa | G02B 6/0033 359/15 |
| 7,454,103 | B2 * | 11/2008 | Parriaux | G02B 5/1814 359/369 |
| 7,511,891 | B2 * | 3/2009 | Messerschmidt | G02B 21/0028 359/652 |
| 8,736,963 | B2 * | 5/2014 | Robbins | G02B 27/0172 359/629 |
| 9,128,281 | B2 * | 9/2015 | Osterhout | G02B 27/017 |
| 2003/0039034 | A1 * | 2/2003 | Hatano | G02B 27/4272 359/576 |
| 2004/0085649 | A1 * | 5/2004 | Repetto | G02B 27/0172 359/633 |
| 2004/0109244 | A1 * | 6/2004 | Kokogawa | G02B 5/1866 359/831 |
| 2004/0245445 | A1 * | 12/2004 | Suzuki | G01N 21/6458 250/234 |
| 2006/0228073 | A1 * | 10/2006 | Mukawa | G02B 6/0033 385/31 |
| 2008/0080060 | A1 * | 4/2008 | Messerschmidt | G02B 21/0028 359/654 |
| 2008/0138013 | A1 * | 6/2008 | Parriaux | G02B 5/1814 385/37 |
| 2010/0177387 | A1 * | 7/2010 | Travis | B29D 11/00663 359/566 |
| 2012/0069232 | A1 * | 3/2012 | Chui | G02B 26/001 348/333.01 |
| 2012/0075168 | A1 * | 3/2012 | Osterhout | G02B 27/017 345/8 |

FOREIGN PATENT DOCUMENTS

| | | |
|---|---|---|
| WO | 02/45413 A1 | 6/2002 |
| WO | 2010/104692 A2 | 9/2010 |
| WO | 2014/016343 A2 | 1/2014 |

OTHER PUBLICATIONS

International Search Report and Written Opinion dated Apr. 12, 2014 in corresponding International Application No. PCT/EP2014/055656, filed Mar. 20, 2014, 21 pages.

Large, M.J, et al., "Parallel Optics in Waveguide Displays: A Flat Panel Autostereoscopic Display," Journal of Display Technology 6(10):431-437, Oct. 2010.

International Preliminary Report on Patentability and Written Opinion dated Sep. 20, 2016, issued in corresponding International Application No. PCT/EP2014/055656, filed Mar. 20, 2014, 14 pages.

* cited by examiner

IMAGING SYSTEM

TECHNICAL FIELD

The present invention relates to imaging systems suitable for inspecting objects or surface portions of an object in equipment having very little space to insert the distal ends of said optical systems. More specifically the present invention relates to an imaging system based on a slim optical device using an optical waveguide, to guide an illumination beam and to form, by the returned light beam, an image.

BACKGROUND OF THE INVENTION

There has been an immense drive in modern optical inspection systems towards miniaturization. This has been necessitated by the need to access hostile, space-limited or difficult environments. Typical fields in which extreme miniaturization of optical inspections systems are developed are: medical endoscopes, borescopes for the inspection of tubes with small diameters, industrial machinery, a wide variety of systems such as security systems based on optical readout. Also, along with the development and widely available microsystems, in situ inspection methods of objects having sub millimeter size for inspection in difficult accessible confined places are becoming mandatory.

Strategies for miniaturization of optical inspection systems to date have included the use of special fibers or fiber bundles, combined with ingenious micro-fabricated lenses, mirrors and beam splitters.

Endoscopes are an example of such devices, and may be flexible or rigid in nature. Flexible endoscopes rely on image transfer through optical fiber bundles and are particularly important in observations through natural openings into organs. These instruments, also known as fiberscopes, typically focus light through a miniaturized objective or a gradient-index (GRIN) lens that create an aiming on an input facet of a coherent fiber bundle, which subsequently acts as an image guide. In order to feed light into an endoscope a relatively complex optical assembly is needed comprising a beam splitter through which the illuminating light can be transmitted to the light guide while at the same time transmitting the received light beam coming from the illuminated object at the distal end of the endoscope. Endoscopes may also be used for the inspection of parts located in narrow openings of industrial machines. A similar concept called borescope is used for the inspection of pipes. Typical endoscopes, fiber bundle inspection systems or borescopes have a typical cross-section of 5-15 mm. The use of lenses, mirrors or beam-splitters is a fundamental limitation on the size reduction of this kind of optical inspection systems. The miniaturization of concepts using these components is a huge technical challenge, especially when side views of the object need to be obtained.

The document US2013/0317295 explains a light assembly for remote visual inspection that allows to illuminate and visualize an object to the side of the distal end of the light assembly. The device disclosed in US2013/0317295 is limited in that it would be extremely difficult to miniaturize the system so that the overall cross section of the device is smaller than 3-5 mm. In other systems a light conducting fiber is attached to the endoscope, such as disclosed in US2004/00442. The system uses special designed conventional lenses to transmit the image of an object to a CCD camera. Again, a basic limitation of the design is the possible miniaturization of the device because of the use of macroscopic lenses.

In some applications optical systems are used that are based on the optical layout of a periscope. Again here most systems rely on the use of lenses and mirrors and the systems are limited to centimeter sized periscopes having centimeter sized cross sections and it is difficult to make periscopes flexible.

Therefore most optical inspection systems based on classical endoscopes, borescopes and periscopes have a limited use where the insertion volumes are extremely small and they are expensive and not realizable in a batch process. With the advent of MEMS technologies new solutions are being proposed for miniature catheters, such as explained the publication of H. Park et al., "Forward imaging OCT endoscopic catheter based on MEMS les scanning", Optics Letters, Vol. 37, nr.13, 2012. Although the use of MEMS components allows to make innovative devices such as scanning micro endoscopes, the systems are still limited in site as connections have to be made to fiber optics and GRIN or other types of small lenses are required. The systems based on MEMS are still limited by outer diameters in the range of several millimeters. Because of the component and assembly costs such systems still have a relative high cost.

In a number of applications optical inspections systems are required that may fit into extremely narrow apertures or slots, having lateral dimensions in the sub millimeter range.

SUMMARY OF THE INVENTION

The object of this invention is to overcome at least partially the limitations of prior art. To this end, the invention relates to an imaging device comprising an optical waveguide arranged to incouple, through an incoupling surface at a proximal end of said optical waveguide, a light beam provided by a light source, to guide that light beam, to outcouple said guided light by a first diffraction grating positioned at a distal end of said optical waveguide, said distal end being substantially opposite to said proximal end, in the length of the optical waveguide, and to recollect partial reflected or diffused light from an object positioned by said first diffraction grating. An imaging subsystem arranged to said proximal end allows to provide an image of at least a portion of said object. The optical waveguide considered here is significantly larger than the optical wavelengths of interest, making it highly multimode.

Compared to imaging devices of prior art the imaging system of the invention does not need optical elements to be aligned and assembled at the illumination distal end. The main advantage of the imaging system compared to systems of prior art is that the illuminating and light collecting portion of the waveguide may be introduced in very narrow places, or places that have a difficult access, such as curved pipes. Also, because of the simplicity of the design the imaging system may be very cheap. A part of the critical improvement is due to the very low aspect ratio of diffraction gratings. Surface diffraction gratings are typically thinner than one micron and allow to redirect a light beam efficiently without needed to be substantially perpendicular to the light propagation axis before or after redirection. The diffracted angle is not dependent only of the grating orientation compared to the incidence angle of the light beam but of the grating period. This allows vast design flexibility and extremely flat aspect ratio structures to redirect light beams.

More specifically the imaging system suitable to provide an image of a surface portion of an object comprises: a light source arranged to provide a light beam, and at least a first optical waveguide having a first face and having a second face opposite to said first face. Said first face comprises an incoupling surface and said optical waveguide comprises an outcoupling surface. A first diffraction grating is arranged on the optical waveguide, and an imaging subsystem is arranged to said outcoupling surface. The imaging system comprises an incoupling surface which is arranged on said optical waveguide, to receive at least a part of a light beam provided by the light source and reflected or scattered by a portion of an object. Through the incoupling surface an incoupled light portion of received light is incoupled, by refraction and/or diffraction into said waveguide. At least a portion of said incoupled light portion is transmitted in said optical waveguide by multiple total reflections, the propagating beam defining a first direction. Optical waveguides allow to transport a light beam over long distance, and flexible waveguides allow to assure this transportation without substantial loss even when said optical waveguides are inserted in curved areas such as curved piping. In order to limit the propagation losses, a shield or a cladding can be positioned around at least a part of the waveguide.

A first diffraction grating is arranged to outcouple, out of said optical waveguide, at least a fraction of said portion, said fraction being defined as outcoupled light. Said outcoupled light is defined as an outcoupled lightbeam and may have a rectangular cross section and may be a divergent, parallel or convergent light beam. Said cross-section may have a ratio of the dimension of its sides of 1:5, preferably 1:10 or more referable greater than 1:50. Said first diffraction grating is designed and arranged to define an illumination area around a distance D from said first diffraction grating, with D between 0-1000 mm, preferably between 0-100 mm, more preferably between 0-10 mm, said first diffraction grating being arranged to direct said outcoupled light to illuminate a surface portion of said object positioned at said illumination area under a main angle of incidence, or a distribution of angles. Using a first diffraction grating as an outcoupler grating allows to provide an efficient optical outcoupler which is extremely flat, as described for example in the document WO2014/016343. It can be designed to outcouple a light beam so that its cross section is substantially a circular shape, an elliptical shape, a rectangular shape, a substantially linear shape or an arbitrary designed shape. Said first diffraction grating may be very short, defined in said first direction, allowing to provide a very narrow outcoupled light beam, similar to a light line in a line-scanner.

Said first diffraction grating is further arranged to couple into said optical waveguide at least a fraction of said part of the outcoupled light returned by said surface portion or volume of an object in a second direction, being opposite to said first direction, said fraction of said part defining a returned light beam and being transmitted in said waveguide by multiple total reflections. The light returned by the portion of an object can be reflected by the object, scattered, reemitted by the object such as in a fluorescence or phosphorescence mechanism or a combination of these phenomena. By using multiple reflections from a substantially flat local surface, defined as the area of said multiple reflection, an image may be transferred without substantial loss of quality, to the contrary of a single fiber guided light wherein the image content of the guided wave would be lost after some total internal reflections because of the multiplicity of waveguided modes.

The outcoupling surface of the waveguide is further arranged to couple out of said optical waveguide, an outcoupled fraction of said returned light beam, said returned light beam being directed to said imaging subsystem facing said outcoupling surface. Said imaging subsystem of the imaging system is arranged to said outcoupling surface and is arranged to provide an image of said surface portion of said object.

The incoupling surface is a portion of said first side, it is defined as the surface portion of said first side on which said light beam is incident at the optical waveguide. Said incoupling surface may be inclined, relative to said first side and it may comprise at least one diffraction grating or any other microstructure such as a microlens array or microprism array or a combination of these structures. The outcoupling surface may comprise a diffraction grating or any other microstructure such as a microlens array or microprism array, or a combination of these structures. Arranging microstructures, such as diffraction gratings, to said incoupling and/or outcoupling surfaces allows an efficient incoupling of the propagating light beam or an efficient outcoupling of the returned light beam in or out of said waveguide, possibly with angular or chromatic dispersion and/or filtering. By appropriate design said microstructures may provide specific shaped in or outcoupled light beam and polarization effects may be used in the design to provide high efficiency coupling and highly contrasted image transfer and image detection.

It is critical to avoid blinding the imaging subsystem with the light coming directly from the light source, which is not providing an imaging information of the at least one object to be imaged. This can be realized, as non-limiting examples, by using a beam splitter or different polarizations for the propagating and returning beam and a polarizer, by separating the propagating and returning light beams spatially in the same or different optical waveguides, by using different illumination and imaging wavelengths and having at least one optical spectral filter, or by using different object illumination and returned light beam incoupling angles or distribution of angles, or a combination thereof.

Said optical waveguide is preferably made of a material chosen from a dielectric group comprising common or special glasses or $TiO_2$, or $HfO_2$, or $Ta_2O_5$, or $ZrO_2$, or AlN, or $Al_2O_3$, or ZnO, or $SiO_2$, or $Si_3N_4$, or $CaF_2$ or MgO, or combinations thereof. Material may also be chosen from a substantially transparent polymer comprising Polyethylene terephtalate (PET), Polycarbonate (PC), Polyethylene napthalate (PEN), Polymethyl methacrylate (PMMA), polyesters, polyethylene (PE), polypropylene (PP), Polyethylene furanoate, Polymethyl metacrylate (PMMA), polymers based on poly (bis-cyclopentadiene) condensates, colorless polyimide (CP), cellulose, PEEK polymers, and their combination. The polymers or composite materials based on a polymer matrix have the advantage of being elastic and thus providing flexibility for thin structures such as the waveguides described here. The polymer or dielectrics can also include additives such as chemicals or nanoparticles. Semiconductors such as Si and Ge or a combination of them may also be chosen as materials for the waveguide, especially is infrared light is used for illumination and imaging. The wide range of possible materials allows to design the imaging device for applications in the UV, visible and infrared parts of the electromagnetic spectrum and best fitting with the specific environmental and optical constraints required by the application targeted.

The first diffraction grating can diffract light at different diffraction order such as in transmission and in reflection, providing more than one main direction for the outcoupled light. The diffraction grating used can also be a complex grating made of inhomogeneous grating or of different portions of homogenous grating. Such complex gratings allow to shape the outcoupled light beam in multiple directions or to collimate the outcoupled beam or to expend the outcoupled beam using wavefront shaping, or a combination thereof. Different portions of the at least first diffraction grating can be used for outcoupling the propagating light beam and to incouple the returned light beam.

Said at least first optical waveguide having a first face and having a second face opposite to said first face can have a substantially rectangular cross-section. Its cross-section can have preferably chamfered or rounded edges.

The first optical waveguide can be at least partially coated on one face or several faces with an adaptation layer. Such adaptation layer can have a refractive index lower than the refractive index of the materials of said first optical waveguide, and as example can be made of a porous layer or of magnesium fluoride (MgF2). Said adaptation layer can also comprise a reflecting layer such as a dielectric based reflecting layer, such as a Bragg mirror adapted to the wavelength and the propagation angle of the preferable mode that should be waveguided by said optical waveguide. Such adaptation layer may comprise an optical cladding, isolating optically the waveguiding core of the optical waveguide from its immediate environment. This adaptation layer can be used to filter modes, or a portion of the optical guided spectrum or also to reduce the propagation losses of said first optical waveguide.

The object of the invention is further achieved by an imaging system suitable to provide an image of a surface portion of an object comprising:
 a light source arranged to provide a light beam,
 at least a first and a second optical, substantially parallel, waveguides.

Said first optical waveguide has a first face to the side of said light source, and has a second face opposite to said first face. Said second optical waveguide has a third face and has a fourth face opposite to said third face, said third face being substantially parallel to said second face. Said first face comprises an incoupling surface, said second optical waveguide comprises an outcoupling surface. A first diffraction grating is arranged on said first optical waveguide and a second diffraction grating is arranged on said second optical waveguide.

The imaging system comprising two separate waveguides, the first one arranged to guide the illumination light beam and the second one to guide the returned light beam, defined also as the imaging light beam, allows to design an image system having a high light intensity throughput. Using two separate optical waveguides allows to design an image system in which said first and said second optical waveguide have a relative angle, said relative angle defined substantially in the plane of said first side. With a configuration comprising two waveguides, the propagating illumination light beam, used for illuminating a portion of the surface of the object to be imaged, and the returning light beam that contains the image information, can be optically separated to avoid that illumination light blinds the imaging subsystem.

An imaging subsystem is arranged to said outcoupling surface and is arranged to the side of said second waveguide opposite to said light source. The incoupling surface of said first optical waveguide is arranged to receive light provided by the light source and to incouple a portion of said received light into said first optical waveguide. Said portion is propagated in said waveguide by multiple total reflections in a first direction. Said first diffraction grating is arranged to outcouple at least a fraction of said portion, said fraction is defined as outcoupled light, forming an outcoupled light beam.

Said outcoupled light beam may have a rectangular cross section and may be a divergent, parallel or convergent light beam. Said first diffraction grating is further arranged to define an illumination area at a distance D from said first diffraction grating, with D preferably smaller than 1000 mm. Said distance may be smaller than 1 mm. Said first diffraction grating is arranged to direct said outcoupled light to illuminate a surface portion of said object positioned at said illumination area, and is further arranged to receive a part of said outcoupled light returned by said surface portion. Using a first diffraction grating to couple light out of said first optical waveguide, independent of said second diffraction grating allows to provide a greater design flexibility and provide a wide range of different shapes and directions of said outcoupled light beam.

Said second diffraction grating is further arranged to couple into said second optical waveguide at least a fraction of said part in a second direction, said second direction being substantially parallel and opposite to said first direction. Said fraction of said part defines a returned light beam and is transmitted in said second waveguide by multiple total reflections. The outcoupling surface is further arranged to couple out of said waveguide an outcoupled fraction of said returned light, said returned light being directed to said imaging subsystem facing said outcoupling surface.

Said imaging system is similar to the one described before. The incoupling surface and the outcoupling surface of the imaging system comprising at least two optical waveguides may be similar to the incoupling and outcoupling surface as described above. The materials that may be used for said two optical waveguides may be similar to the ones described before.

Said first optical waveguide may comprise a third diffraction grating facing said first diffraction grating and said second optical waveguide may comprise a fourth diffraction grating facing said second diffraction grating. Arranging substantially facing diffraction gratings to outcouple or incouple light out or in said optical waveguides allows to have a wider design capability and to change the direction of the propagating light beam before or after diffraction by said first or second diffraction grating.

Said first and said second optical waveguides may be separated by an adaptation layer arranged between said first and second optical waveguides, said adaptation layer can have a refractive index lower than the refractive index of the materials of said first and said second optical waveguide, and as example can be air or may be made of a porous layer or of magnesium fluoride (MgF2). Said adaptation layer can also contain a reflecting layer such as a dielectric based reflecting layer, such as a Bragg mirror adapted to the wavelength and the main propagation angle that should be waveguided. The adaptation layer can be located only on a portion of the said first or second side of the waveguide.

The imaging system may comprise a third optical waveguide arranged to said first optical waveguide, to the side of said light source,—said third optical waveguide comprising at least a further diffraction grating and a further outcoupling surface. The third waveguide comprises a second imaging subsystem arranged to said further outcoupling surface, said second imaging subsystem being arranged to provide an image of a portion of an object facing said third optical waveguide. An object may be positioned to the side of the second optical waveguide and/or to the third optical waveguide. The two objects may be part of the same object, for example an U shaped object, presenting different portions of its surface facing said second and third optical waveguide, substantially facing respectively said second and further diffraction grating. Arranging the image system so that it comprises said three optical waveguides allows to image two objects or parts on two objects, or parts of the same object, positioned each to opposite sides of the image system.

Said third optical waveguide may have a shorter length than said first waveguide, said third optical waveguide may be further arranged so that said light beam may be incident on said first face without passing through said third optical waveguide. Said third optical waveguide may have the same length, defined in the propagating direction of the light in the optical waveguide. Said first optical waveguide and said third optical waveguide may be arranged so that at least a portion of said light beam passes through the thickness of said third optical waveguide, substantially perpendicular so as to illuminate directly said incoupling surface without crossing said third optical waveguide. Designing the image system so that the optical waveguides do not have the same lengths allows to widen the design possibilities and allow for example to provide enough space between said light source and said second imaging system.

Said first, second and third optical waveguides may be arranged so that at least two of said optical waveguides are not parallel.

The imaging system may be further improved by using a polarized light source, said light source may be a laser light source. A quarter wave-plate may be arranged to said first, second or third diffraction grating. Thus, the performance of the image system, such as image contrast, may be considerably improved. By using a polarizer, the imaging subsystem can be prevented from being blinded by direct light coming from the light source in configurations where this could happen.

Said first diffraction grating and/or said second diffractive grating and/or third diffractive grating may comprise, each, a series of diffraction gratings, said gratings may be arranged to provide a plurality of outcoupled and/or incoupled light beams, said plurality of outcoupled and/or incoupled light beams being not parallel. Providing a plurality of non-parallel light beams to illuminate an object and recollect the returned light by the reflection of a portion of said non parallel beams allows to provide an image system that may perform a distance analysis of the object and/or to perform a 3D analysis of at least a part of the surface of said object, by using well known optical parallax effects. Said first diffraction grating and/or said second diffractive grating and/or third diffractive grating may comprise a non-homogenous grating or an hologram, allowing to create one or a plurality of non parallel light beams, such as but not limited to converging or diverging light beams, using wavefront shaping diffractive optical elements.

BRIEF DESCRIPTION OF THE DRAWINGS

The above described objects and advantages of the present invention will become more readily apparent to those ordinarily skilled in the art after reviewing the following detailed descriptions and accompanying drawings, in which.

DETAILED DESCRIPTION

Figure 1:
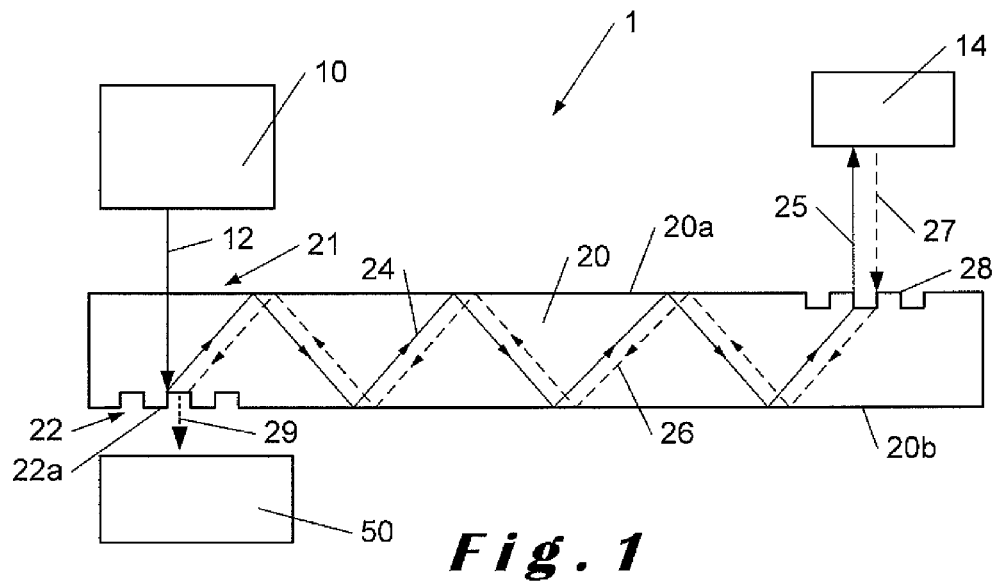
FIG. 1 illustrates a side view of an imaging system comprising one optical waveguide.

The following detailed description illustrates the principles and examples of embodiments according to the invention. It will thus be appreciated that those skilled in the art will be able to devise various arrangements that, although not explicitly described or shown herein, embody the outlined principles of the invention and are included in its scope as defined in the claims. In the description and the figures, similar reference signs refer to the same or similar components or structural elements.

Imaging system 1 according to the invention comprises a light source 10 which is coupled into an optical waveguide 20. A part of the guided light 24 illuminates an object 14 and returned light beam 26 returned by the optical waveguide 20 is directed on an imaging system 50. The imaging system 1 of the invention does not require any optical elements that must be assembled at the extremity of the optical waveguide 20, which simplifies considerably the optical system, makes it more reliable and to contrary to solutions of prior art to inspect objects that are located into places having a very narrow access.

Figure 2:
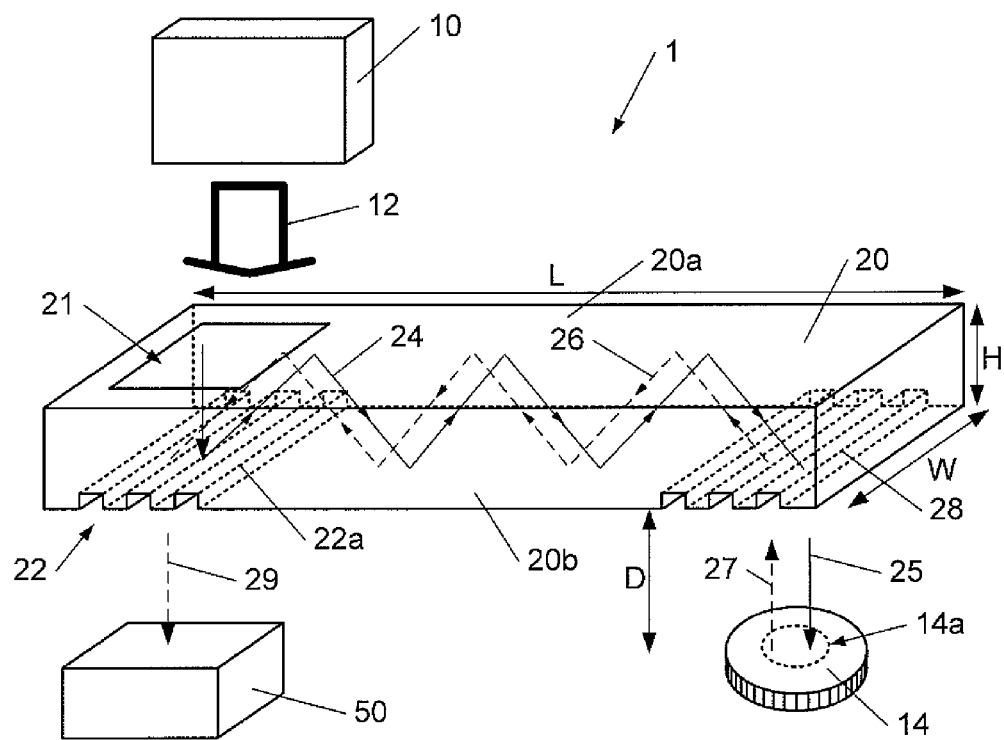
FIG. 2 illustrates a 3D view of an imaging system comprising one optical waveguide.

An exemplary embodiment of the invention is shown in FIG. 1 and FIG. 2. A light source 10 is arranged to the optical waveguide 20 having a first face 20a to the side of said light source 10 and a second side 20b to the side opposite to said first face 20a. The optical waveguide 20 has a substantially rectangular cross section, said cross section having a dimension of H×W, said optical waveguide 20 comprising on said first face 20a and said second face 20b a first extremity area and a second extremity area defined each as opposite areas, or proximal and distal ends, located at the extremities of said optical waveguide 20, in the length of the optical waveguide 20, said length being defined substantially as the direction of the propagating light 24 in said optical waveguide 20.

A light beam 12 provided by said light source 10 enters into the optical waveguide 20 through an incoupling surface 21, which is a defined as a portion of the surface of said first side 20a preferably located at said first extremity area. Said incoupling surface is defined as the surface on which incident light provided by said light source is incident. Preferably said incoupling surface separates an air medium and the optical waveguide medium. The second side 20b said optical waveguide 20 comprises an outcoupling surface 22 comprising a diffraction grating coupler 22a. The diffraction grating coupler is arranged on said outcoupling surface 22 to diffract, inside said optical waveguide 22, at least a fraction of incoming light beam 12 provided by the incoupling surface 21. Said outcoupling surface 22 is facing at least partially said incoupling surface 21, said outcoupling surface 22 and said diffraction grating coupler 22a may have a different size, defined in said second side 20b, than said incoupling surface 21. After diffraction by said diffraction grating coupler 22a, said fraction of incoming light is propagated as a first guided light beam 24, propagating in a first direction, from said first extremity area to said second extremity area, in said optical waveguide 20 by internal reflections into said optical waveguide 20. Said internal reflections are made possible by choosing materials of the optical waveguide 20 so that the refractive index of said material is higher than the refractive material of the surrounding medium of said optical waveguide. Said surrounding medium is typically air but may be another medium such as a liquid. The optical waveguide 20 is arranged to guide UV light, or visible light or infrared light. It can be especially interesting to arrange the optical waveguide to guide a substantially monochromatic light distribution or a light beam comprising a series of substantially monochromatic beams. Said imaging system 1 may be arranged so that said monochromatic light beams propagate with different total reflection angles in said optical waveguide. Typical materials chosen for the optical waveguide 20 are dielectric materials, sapphire, silicon or polymers. Dielectric materials may be chosen among the group is made of a material chosen from a group comprising TiO2, or HfO2, or Ta2O5, or ZrO2, or AlN, or Al2O3, or ZnO, or SiO2, or Si, or Si3N4, or MgF2, or CaF2, or MgO, or Ge or a combination thereof.

Said optical waveguide 20 may be made of a material chosen from the group comprising Polyethylene terephtalate (PET), Polycarbonate (PC), Polyethylene napthalate (PEN), Polymethyl methacrylate (PMMA), polyesters, polyethylene (PE), polypropylene (PP), Polyethylene furanoate, Polymethyl metacrylate (PMMA), polymers based on poly (bis-cyclopentadiene) condensates, colorless polyimide (CP), cellulose, PEEK polymers, and their combination.

The length L of the optical waveguide 20 is preferably smaller than 1000 m, may be between 100 mm and 500 mm, the width W is preferably smaller than 500 mm and may be between 5 mm and 50 mm and the height H is preferably smaller than 10 mm and may be between 0.05 mm and 3 mm Other dimensions may advantageously be chosen depending on the applications. The optical waveguide 20 has a substantially rectangular cross section (H×W) and comprises substantially straight edges, said edges being defined as the intersections of the surfaces of the optical waveguide 20. The optical waveguide 20 may comprise at least one rounded edge. In a variant, the length L is larger than the width W and the width W is larger than the height H.

On said second face 20b and arranged to said second extremity area of said optical waveguide 20, a first diffraction grating 28 is provided, said first diffraction grating 28 being arranged to outcouple outside said optical waveguide 20, a fraction of said first guided light beam 24, said fraction being defined as outcoupled light. Said outcoupled light beam may have a circular or elliptical shaped cross section, but may also have a rectangular cross section. Said first diffraction grating 28 is further arranged to direct said outcoupled light to an illumination area 14a which is preferably positioned to a distance D smaller than 100 mm to said first diffraction grating 28. In a variant the distance D may be smaller than 10 mm, preferably smaller than 2 mm. Said first diffraction grating may be very narrow, in the length of said optical waveguide, and provide a very narrow outcoupled light beam having a width substantially equal to the width of said first diffraction grating, allowing to illuminate said object with a substantially line shaped illumination area 14a. As an example, an optical waveguide may have a length of 50 mm, a width of 8 mm and a thickness H of 1 mm. Said first diffraction grating 2 may have a length, defined in the direction of the propagating illumination beam 24, of 12 mm and may have a width of 7 mm. Said first diffraction grating may be arranged to provide an outcoupled lightbeam 25 having, substantially close to said first diffraction grating 28, a cross section of 12 mm×7 mm and may have a cross section of 12 mm×1 mm at the location of said illumination area 14a, said illumination area 14a being at a distance D of 10 mm. To avoid having the returned light beam 27 incoupled into the first optical waveguide 20, the size of the first diffraction grating in respect to the waveguide thickness may especially verify the condition that:

$$D \leq 2 \cdot WT \cdot \tan \beta$$

The length (D) of the first diffraction grating, in the main direction of propagation, measured on one of the faces of the optical waveguide in the direction of the diffracted beam is related to the thickness (WT) of the waveguide and to the angle between the optical waveguide surface normal and the light beam inside said multimode optical waveguide.

An object 14 or a fraction of the surface of said object 14 may be positioned at said illumination area 14a and may receive at least a portion of said outcoupled light 25. A fraction 27 of reflected or diffused light of said portion by said object 14 or by a fraction of the surface of said object 14 is transmitted in the direction to said first diffraction grating 28 and is incident on said first diffraction grating 28. The intensity of the received light of said fraction 27, by said first diffraction grating 28, depends on the intensity of said light source 10 and on the surface reflection properties of the object 14 or the surface fraction of said object 14 positioned at said illumination area 14a.

Said first diffraction grating 28 is further arranged to couple inside said optical waveguide 20 a portion of said received light. Said first diffraction grating 28 is thus arranged as an outcoupler for a fraction of the said first guided light beam 24 and is also arranged as an incoupler for the reflected or diffused light by said surface of said object 14. The applicant has filed several patent applications related to specific diffraction gratings that may be arranged and combined to realize such dual-functional diffraction grating couplers, dual-functional meaning they may be arranged to incouple and outcouple light beams. One can refer to the patent applications PCT/EP2013/065631 and WO2014016343 filed by the applicant to obtain details regarding the design, the method of realization and the obtained transmission and light coupling characteristics of grating structures or their combinations that may be adapted and to realize said dual-functional diffraction grating couplers.

Said first diffraction grating 28 diffracts said received light into said optical waveguide 20 so that the angle of the diffracted light inside said optical waveguide 20 is higher than the total reflection angle of said optical waveguide 20 and so that said diffracted light is propagated as a second guided light beam 26 in said optical waveguide 20 in a second direction, defined as the direction opposite to said first direction. After at least one internal total reflection said second guided light beam 26 is incident on said outcoupling surface 22 comprising a diffraction grating coupler 22a. To design and realize this diffraction grating coupler 22a one may refer to the patent applications PCT/EP2013/065631 and WO2014016343 filed by the applicant. Said diffraction grating coupler 22a is arranged to couple out of said optical waveguide 20 at least a fraction of said second guided light beam 26, said fraction being defined as the imaging light beam 29.

An imaging subsystem 50, arranged to said diffraction grating coupler 22a, comprises at least one optical element arranged to form an image of said object 14 or said surface fraction of the object 14, as illustrated in FIG. 1 and FIG. 2. Such imaging subsystem comprising optical elements is well known to the person skilled in the art and will not be further explained. Straightforward examples of optical elements are refractive and/or diffractive lenses, mirrors, micro lens array. Said imaging subsystem 50 may comprise passive and/or active optical elements such as micromirrors or microshutters or a combination of them.

Said imaging light beam 29 may be a parallel light beam or may be a diverging or a converging light beam, depending on the design of said diffraction grating coupler 23. The central optical axis of said imaging light beam 29 may be oriented substantially parallel to the normal direction to said second face 20b or may have an angle with said normal direction. The imaging detector of said imaging device may be a CCD camera, a film or any imaging device. Said optical imaging subsystem may comprise optical elements designed and arranged to direct the light into a human eye. In a variant of the imaging system a human eye may look in the direction of said output surface 22 comprising a diffraction grating coupler 22a. In that variant a holder may replace said imaging subsystem, said holder being adapted to said outcoupling surface 22, said holder being designed to avoid lateral straylight, improving as such the contrast of the image of the object 14, or fraction of the surface of the object 14, perceived by the eye.

In a variant of the preferred embodiment said optical waveguide 20 may comprise to said first side 20a or said second side 20b at least an adaptation layer which may be a cladding layer, said cladding layer having a lower refractive index than the material of said optical waveguide and having a higher refractive index than the surrounding medium in which the optical waveguide 20 is inserted or imbedded. Adapting at least one cladding layer to one of said first 20a or second 20b faces allows to improve the mechanical resistance and reduces the risk of damage to the optical waveguide 20 surface, for example when said optical waveguide 20 is introduced into a narrow opening. Said cladding layer may be partially removed, by for example chemical etching or mechanical polishing techniques, so that said diffraction gratings may be realised directly to the optical waveguiding core of said optical waveguide 20, allowing as such a higher incoupling and/or outcoupling light efficiency.

Figure 3:
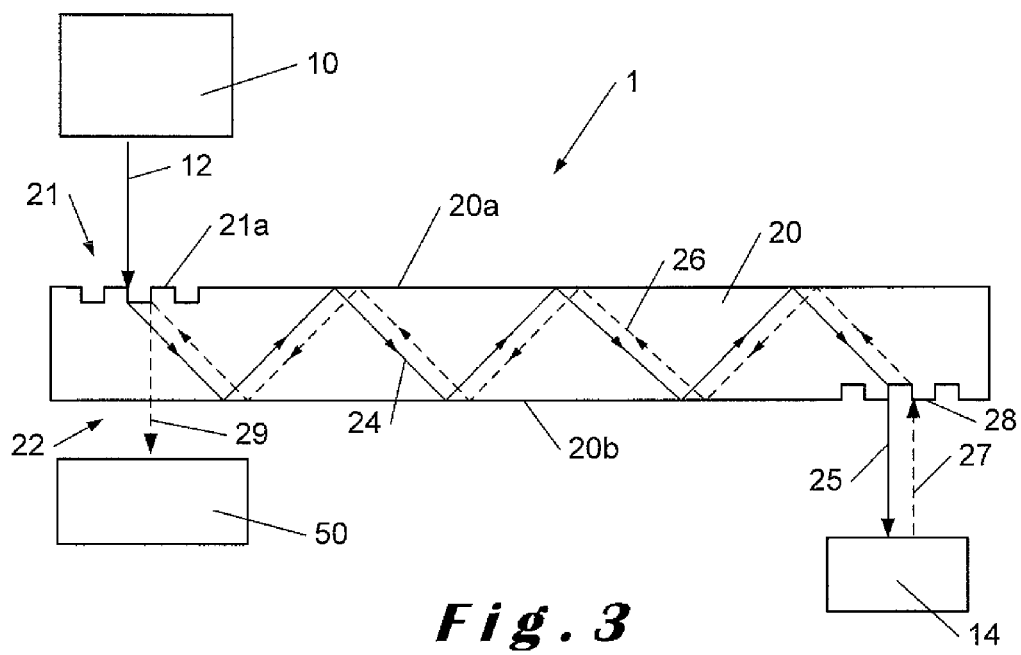
FIGS. 3-5 illustrate different embodiments of an imaging system comprising one optical waveguide.

In another embodiment a diffraction grating coupler 21a, defined as a grating incoupler, may be arranged on said incoupling surface 22, as illustrated in FIG. 3. In the embodiment of FIG. 3, incident light provided by said light source 10 is diffracted at said first side 20a by said diffraction grating coupler 21a which is arranged as a grating incoupler 21a. In the embodiment of FIG. 3, similar to the embodiment illustrated in FIG. 1, a fraction of the light provided by said light source 10 is directed to said surface of the object 14 and an image of said object 14 or a fraction of the surface of said object 14, may be formed by an optical imaging subsystem 50 arranged to said incoupling surface 21 comprising said grating incoupler. Said grating incoupler may be designed and arranged to optimise the incoupling of light provided by said light source 10 while at the same time being optimized also to maximize the light outcoupled of said optical waveguide 20. Said first diffraction grating 28 may be arranged to said first side 20a or said second side 20b. Said object 14 may be positioned to said first side 20a or to said second side 20b. Said first diffraction grating 28 may be designed as a transmission diffraction grating, so that the light is outcoupled at the side to which said first diffraction grating 28 is arranged, or said first diffraction grating may be designed as a reflection diffraction grating arranged to reflect at least a portion of said first light beam 24 and to direct said portion to the side of the optical waveguide 20 facing said first diffraction grating 28, allowing said portion to be outcoupled out of said optical waveguide 20 to the side facing said first diffraction grating 28.

Figure 4:
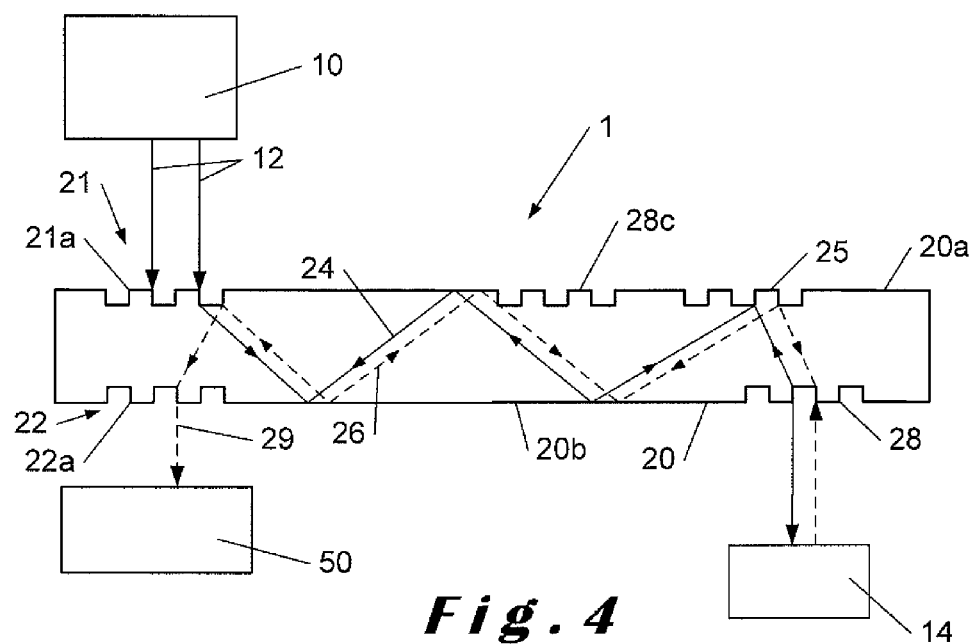

In an embodiment illustrated in FIG. 4 the optical waveguide 20 comprises a diffraction grating 21a arranged on said incoupling surface 21 and an at least one further diffraction grating 25 is arranged on said first face 20a or said second face 22b, facing said first diffraction grating 28. Said further diffraction grating 25 is arranged facing said first diffraction grating 28, said further diffraction grating 28 may be a different grating type than said first diffractive grating 28 and may have a different dimension, defined in the plane of said first diffraction grating 28. The center part of said further diffraction grating 25 can be offset relative to the center part of said first diffraction grating 28. Said further diffraction grating 25 may be adapted to change the direction of said guided first light beam 24 before said guided first light beam 24 impinges on said first diffraction grating 28. In the embodiment illustrated in FIG. 4 an outcoupling grating 22a is arranged to said outcoupling surface 22, facing substantially said incoupling surface 21, said outcoupling grating 22a may also be positioned at any place along the length of said second face 20b, for example substantially at mid length of said optical waveguide 20.

In a variant of the embodiments of FIGS. 1-4, other types of outcoupling structures may be arranged as outcouplers for said second guided light beam. For example an array of microprisms or microlenses may be arranged as an alternative of said outcoupling grating. Different types of outcoupling structures may be combined, for example diffractive grating structures realized on a microlenses array. Such a microlenses array and/or diffractive structures may for example be realized directly on said optical waveguide by direct embossing techniques. Such techniques are well know to the man skilled in the art and will not be further explained.

Figure 5:
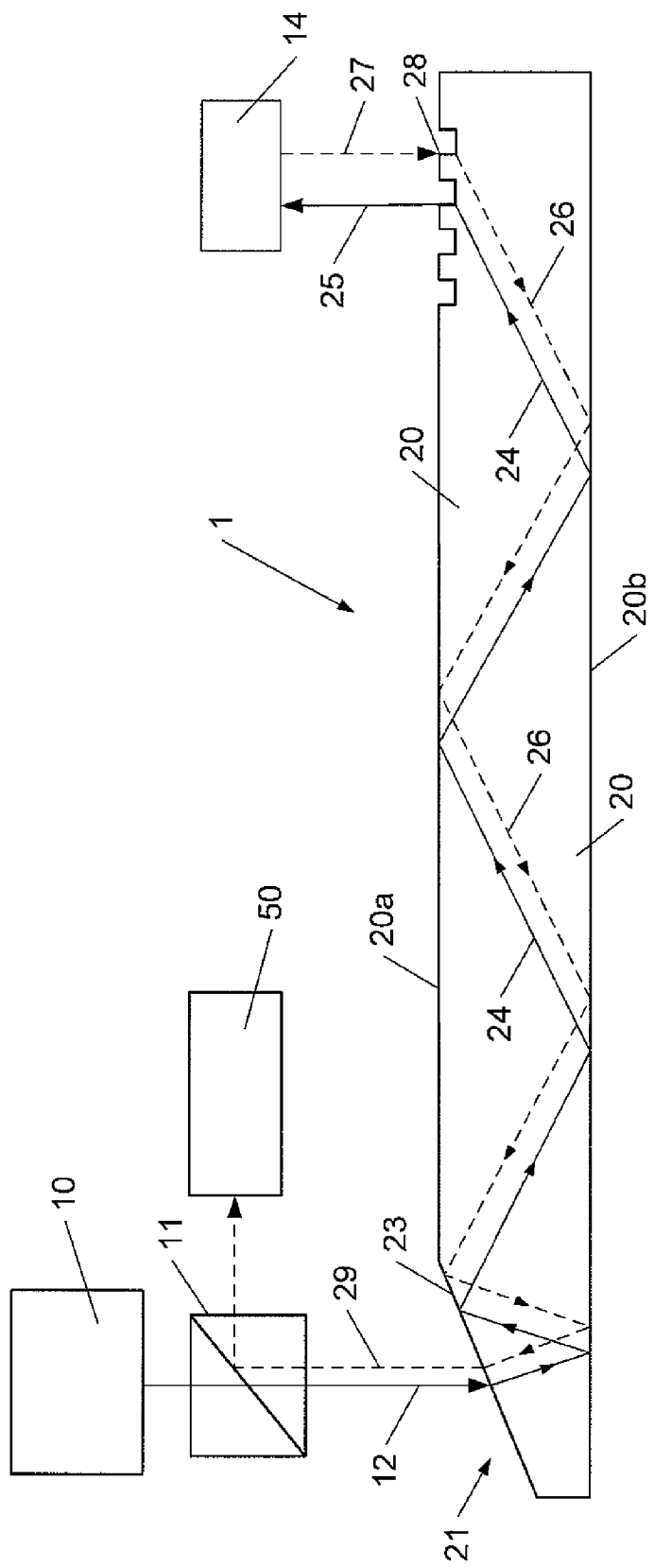

In an embodiment illustrated in FIG. 5 said incoupling surface 21 is a surface portion of said first face 20a, said surface portion being inclined relative to said first face 20a. Said inclined surface, also defined as a wedge 23, is arranged to incouple, by refraction at said wedge, at least a fraction of said light beam 12. Said wedge 23 is also arranged to couple outside said optical waveguide 20 at least a portion of said second guided light beam 26. Said wedge 23 may comprise a diffraction grating or may comprise other microstructures such as microprisms or microlenses. The combination of a diffraction grating, microprism or microlenses with said wedge may improve the incoupling and outcoupling light efficiencies.

In an embodiment, the imaging system comprises at least a first optical waveguide 120 and a separate second optical waveguide 130, said first 120 and second 130 optical waveguide being arranged substantially parallel to each other. Said first optical waveguide 120 comprises a first face 120a and a second side 120b, said first side 120a being to the side of the light source. Said second optical waveguide has a third face 130a, facing said second side 120b and a fourth side 130b. Said fourth side 130b faces an object 14, positioned at a distance smaller than 100 mm, preferably smaller than 20 mm, more preferably smaller than 5 mm. Said first optical waveguide 120 comprises an incoupling surface 122 and said second optical waveguide 130 comprises an outcoupling surface 132. Said first optical waveguide 120 and said second optical waveguide 130 may have at least a cladding layer and may have a different length, height or width. Said first and said second optical waveguides may be separated by a separation layer 200. Said separation layer may be a glue layer or may be a layer comprising spacers allowing to separate said waveguides. In a variant in which at least one of said first optical waveguide 120 and said second optical waveguide 130 has no cladding, said separation layer has a higher refractive index than the waveguide without cladding layer. Said separation layer 200 may cover only partially at least one of said optical waveguides 120, 130. A portion of said second face 120b and said thirst face 130a may be separated by an additional separation layer 202. Said additional separation layer 202 may be an air layer or a layer comprising a different material than said separation layer 200.

In a variant said second diffraction grating 138 may be a first series of diffraction gratings, and a second series of diffraction gratings may be arranged at said outcoupling surface 132. Each of said first series of diffraction gratings defines a returning light beam 136. Each of said returning light beam 136 may be provided by reflected light of a different part of said object 14. Each of said returning light beams may also be provided by reflected light from the same part of the object, said same part reflecting light to each of said first series of diffraction gratings with a different angle. One of each diffraction grating of said first series may communicate with one of each of diffraction gratings of said second series and said communicating diffractive gratings may be arranged to spatially separate the illumination beam and the returned light beams. One of each diffraction grating of said first series may communicate with one of each of the diffraction gratings of said second series, said communicating diffractive gratings may be arranged to provide images of the said object at different spectral ranges or under various illumination condition of the object. The collection of returned light coming from different directions from the object 14, by using an advantageously chosen combination and arrangement of series of communicating diffraction gratings, may provide information on the position of the object, on the 3D surface profile of at least a fraction of the surface of said object, on the fluorescence or phosphorescence of at least a fraction of the surface of said object, of the light scattering of at least a fraction of the surface of said object or of the light absorption of at least a fraction of the surface of said object.

The embodiment, in which said first diffraction grating comprises a series of diffraction gratings, may also be applied to a similar embodiment of an imaging system comprising one optical waveguide 20 as shown in FIGS. 1-4, 8.

Said first optical waveguide 120 is arranged to guide a first light beam 124, provided by said light source 10 and coupled into said first optical waveguide 120 by said incoupling surface 121 which may comprise a diffraction grating or which may comprise an inclined surface. A first diffraction grating 128 arranged to said first optical waveguide 120 is arranged to outcouple a fraction 128a of said guided first light beam 124. At least a fraction 128b of said transmitted light 128a is transmitted to said second diffraction grating 138 which is arranged to outcouple a fraction of said transmitted light 28b in the direction of said object 14, in order to illuminate said object 14 or a fraction of the surface of said object 14. Said second optical waveguide 130 is further arranged, similar to the embodiments of FIGS. 1-4, to collect and guide light of at least a fraction of the reflected or diffused light by the illuminated fraction of the surface of said object 14. Similar to the embodiments of FIGS. 1-4, an imaging subsystem 50 is arranged to said outcoupling surface 132. Said outcoupling surface may comprise a diffraction grating 132a or any other type of outcoupling microstructure, such as microlenses or microprisms.

In an embodiment said first optical waveguide 120 and said second optical waveguide 130 may not be parallel and may be arranged with an angle relative to each other. For example said first optical waveguide 120 and said second optical waveguide 130 may have different widths and may be arranged so that the propagating lightbeams 128 and 136 have a relative angle, for example 10°.

Figure 6:
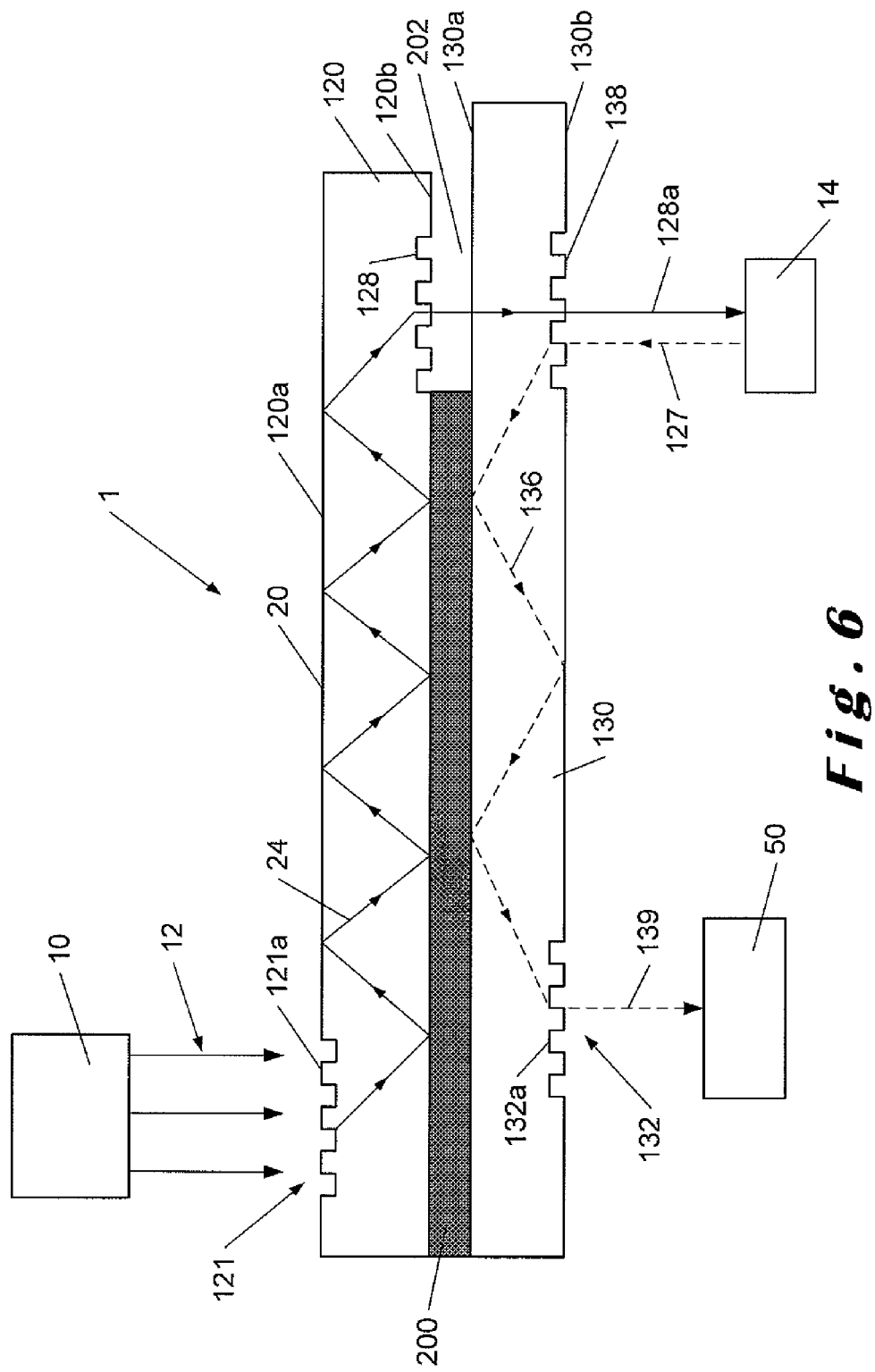
FIG. 6 illustrates an imaging system comprising a first optical waveguide and a second optical waveguide.
Figure 7:
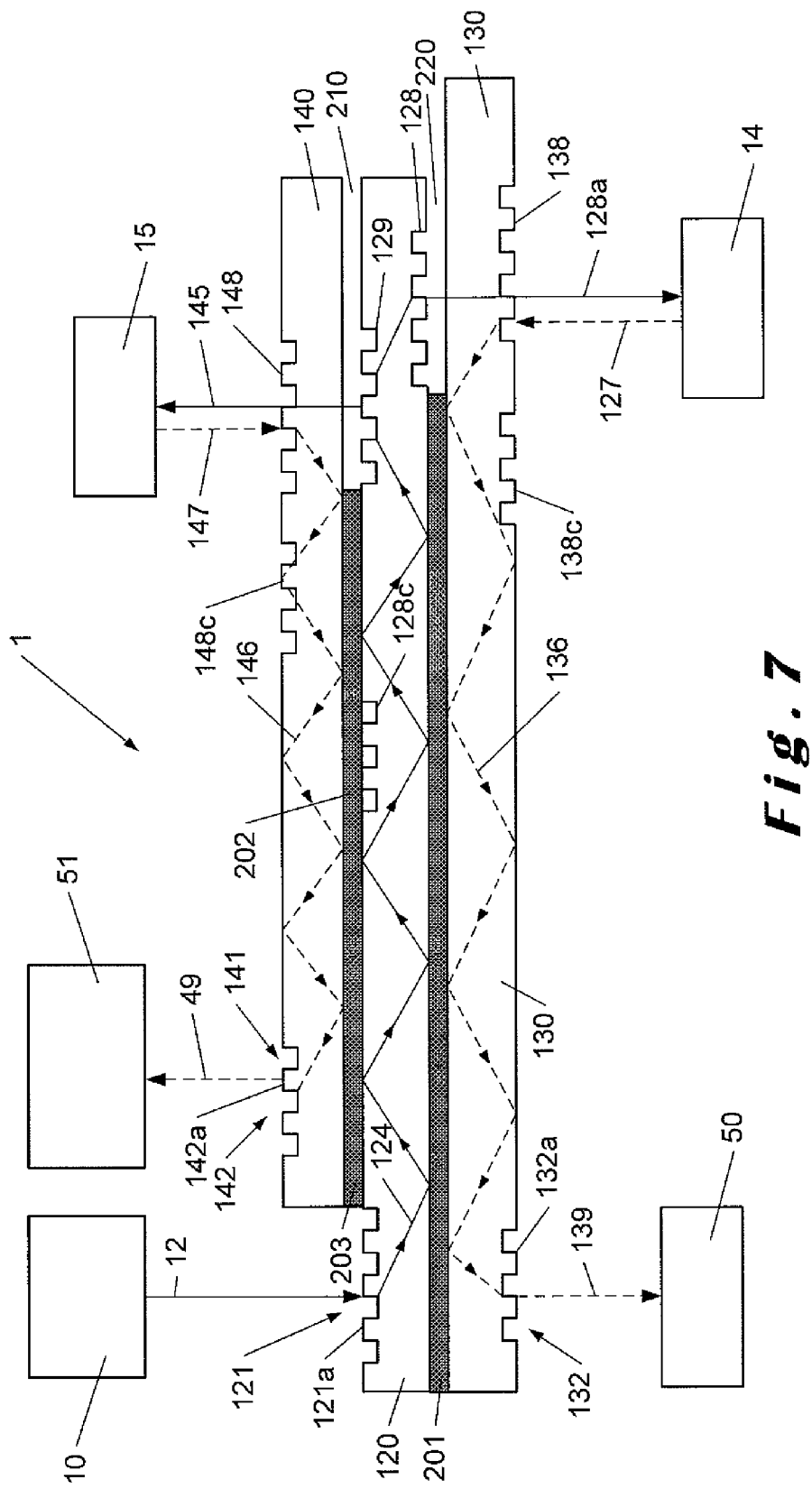
FIG. 7 illustrates an imaging system comprising a first optical waveguide a second optical waveguide and a third optical waveguide.

In an embodiment, similar to the embodiment of FIG. 6, at least three optical waveguides, separated by adaptation layers 201, 203, are arranged in said imaging system. A first optical waveguide 120 is arranged to provide the illumination light beam 124 and further arranged to provide at said second extremity area of said first optical waveguide two opposite illumination beams 35, 45. Said two illumination beams 35, 45 illuminate respectively at least a surface portion of a first object and a second object. In a similar arrangement of the embodiment of FIG. 6 a second optical waveguide 130 and a third optical waveguide 140 are arranged to said first optical waveguide 120, each to opposite sides of said first optical waveguide 120. Similar to FIG. 2, a first 50 and a second 51 imaging subsystem are arranged to respectively said second 130 and said third 140 optical waveguide. By an arrangement of 3 optical waveguides as illustrated in FIG. 7, an image may be formed of at least a fraction of a surface of two objects, each of said two objects being positioned to opposite sides of said imaging system. Said two objects may be part of the same object, for example an object having a U-shape or parts of an assembly of objects. Compared to devices of prior art this allows to provide an imaging device which may inspect facing objects separated by a very small distance. Said distance is typically smaller than 100 mm and may be 10 mm, may be 5 mm or may be smaller than 2 mm.

In another embodiment of the invention, a polarized light source may be used and the diffraction gratings may be arranged to outcouple and/or to incouple only TE or TM polarized light. In order to improve the incoupling and outcoupling efficiency of the incoupling and/or outcoupling diffraction gratings a quarterwave plate 400 may be arranged to said first and/or second diffraction gratings of the embodiments of FIGS. 1-7. Outcoupled polarized light is transformed into circular polarized light by said quarterwave plate. The reflected or diffused light by said object 14 can have a random polarization or can have a polarization mostly similar to the lightbeam 25, 128a, 145 illuminating the object 14, for example in the case of metallic surfaces. In both cases, a large fraction of the reflected or scattered or reemitted by the object will have a polarization substantially circular and be linearly polarized with a perpendicular orientation compared to the light directed to said object 14. As such, the light reaching said first 28 or second 138 diffraction grating will have a polarization at 90° of the polarization of the outcoupled light beam. The imaging system may be arranged to transmit TE polarized light as the illuminating guided wave 24, 124 and may be arranged so that the returning light beams 26, 126, 136 have a TM polarization, or vice versa. Using a polarized illuminating light beam 24 and a returning 26, 126, 136 light beams, allows to extend the design variants of the imaging system 1. For example, in a variant of the embodiment of FIG. 7, at least one of the optical waveguides 130 or 140 may be arranged to illuminate said object 14 with polarized light, and at least one imaging system 50, 51 may be adapted which is at least partially sensitive to polarized light.

In an embodiment a fluorescent layer may be adapted to said incoupling surfaces 21, 121, 122 or said outcoupling surfaces 22, 132, 142. This allows to illuminate the object with UV light or to detect UV light provided by UV light reflection from the object. It is of course as well possible to collect light, by said first diffraction grating 28, or said second diffraction grating 138 or said fourth diffraction grating 148, directly reemitted by the object, fluorescence being an interesting example to image cells or bacteria.

Figure 8:
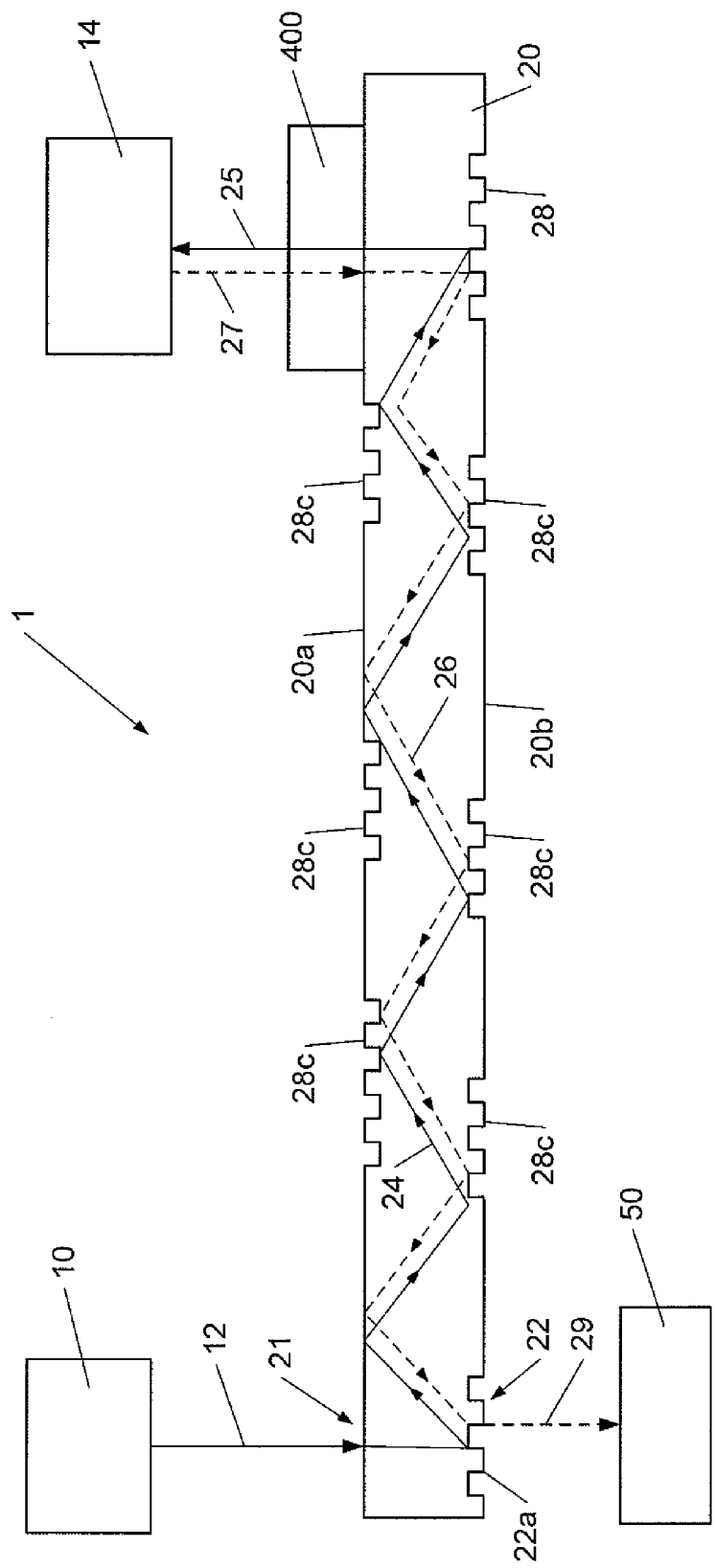
FIG. 8 illustrates an imaging system comprising a quarter wave plate and redirecting structures.

In an embodiment, as illustrated in FIG. 8 and in FIG. 7 redirecting structures 28c, 138c, 148c may be arranged to said optical waveguides. Redirecting structures may be arranged to change the reflection angle of totally reflected light or may be used to couple out of the waveguides non desired modes of the optical waveguides. Redirecting structures may be arranged on said first, said second or said third optical waveguides 20, 120, 139, 140. Said redirecting structures 48c, 148c may change the light propagating property of the waveguide and may comprise scattering elements, surface roughness or structures, absorbing elements or fluorescent or phosphorescent elements. These redirecting structures may change the light output of the waveguide by removing some modes or colours and/or adding some colours in the case of fluorescent or phosphorescent materials. Some of these redirecting structures 48c, 138c, 148c may be incorporated into the optical waveguides 120, 130, 140, for example in the case of a polymer optical waveguide by mixing said scattering elements in the polymer matrix. Said redirecting structures 48c, 138c, 148c are preferably arranged in specific locations at the surface of said optical waveguides 120, 130, 140, such as near to said incoupling surfaces 21, 121, 122, or near to said output coupling surfaces 22, 132, 142, along the whole optical waveguide or they may be arranged periodically at the surface of said optical waveguides and being arranged to absorb guided modes or portions of colours that can propagate in the optical waveguides 120, 130, 140.

In all embodiments of the invention specific layers may be adapted to said incoupling and outcoupling surface. For example a fluorescent layer may be arranged to said incoupling surfaces 21, 121, 122.

The object of the invention is not limited to optical waveguides having substantially rectangular shaped faces. The optical waveguides may have a square shape, defined in the direction of the light beam propagation in the waveguides and may have also dimensions of said first and said second faces greater than 100×100 mm. The surface ratio of the cross sections of the waveguides (H×W) with the surfaces of said first sides or said second side of the optical waveguides.

The object of the invention is not limited to first, second or third grating structures that are arranged to provide a collimated or diverging or converging outcoupled light beam 25, 128a, 145. Said outcoupled light beam may comprise a plurality of parallel and/or non parallel light beams. For some specific application, the optical imaging subsystem may be composed of 2 or more optical imaging subsystems. For some specific application, the light source may be composed of 2 or more light sources, possibly with different spectral ranges or light beam shapes. In some cases, image reconstruction, stitching, and filtering algorithms may be used to reconstruct images larger than the outcoupled light beam dimension or to filter out the useful information. This is especially useful in the cases where the returned light beam is substantially a linear beam. The imaging system disclosed in this document can be integrated into different systems with various attachment, holding mechanisms and actuators.

The invention claimed is:

1. An imaging system for providing an image of a surface portion of an object, the system comprising:
a light source arranged to provide a light beam;
at least a first optical waveguide having a first face and having a second face opposite the first face, the first face comprising an incoupling surface, the optical waveguide comprising an outcoupling surface;
a first diffraction grating arranged on the optical waveguide;
an imaging subsystem arranged to face the outcoupling surface;
wherein:
the incoupling surface is arranged to receive a light beam provided by the light source and incouple a portion of received light beam into the optical waveguide, the portion being transmitted in the optical waveguide by multiple total reflections in a first direction;
the first diffraction grating is arranged to outcouple at least a fraction of the portion, the fraction being defined as outcoupled light, the first diffraction grating being further arranged to define an illumination area at a distance D from the first diffraction grating, the distance D being smaller than 1000 mm, the first diffraction grating being arranged to direct the outcoupled light to illuminate a surface portion of the object positioned at the illumination area, the first diffraction grating being further arranged to receive a part of the outcoupled light returned by the surface portion;
the first diffraction grating is further arranged to couple into the optical waveguide at least a fraction of the part in a second direction, being opposite to the first direction, the fraction of the part defining a returned light beam and being transmitted in the optical waveguide by multiple total reflections;
the outcoupling surface is further arranged to couple out of the optical waveguide, an outcoupled fraction of the returned light beam, the outcoupled fraction being directed to the imaging subsystem facing the outcoupling surface; and
the imaging subsystem is arranged to provide an image of the surface portion of the object.

2. The imaging system of claim 1, wherein the incoupling surface is a portion of the first face.

3. The imaging system of claim 2, wherein the incoupling surface is inclined relative to the first face.

4. The imaging system of claim 2, wherein the incoupling surface comprises a diffraction grating.

5. The imaging system of claim 1, wherein the outcoupling surface comprises a diffraction grating.

6. The imaging system claim 2, wherein the optical waveguide is made of a material chosen from the group comprising Polyethylene terephtalate (PET), Polycarbonate (PC), Polyethylene napthalate (PEN), Polymethyl methacrylate (PMMA), polyesters, polyethylene (PE), polypropylene (PP), Polyethylene furanoate, Polymethyl metacrylate (PMMA), polymers based on poly (bis-cyclopentadiene) condensates, colorless polyimide (CP), cellulose, PEEK polymers, or a combination thereof.

7. The imaging system of claim 1, wherein the light source is a polarized light source.

8. The imaging system of claim 1, wherein the first diffraction grating is a series of diffraction gratings or a non-homogenous diffraction grating or a combination thereof.

9. The imaging system of claim 1, wherein an optical cladding is arranged to at least a portion of a surface of the first optical waveguide.

10. The imaging system of claim 1, wherein at least a redirecting structure is arranged on the first optical waveguide or/and on the optical cladding.

11. The imaging system of claim 1, wherein the outcoupled light forms a light beam having a rectangular cross section, defined perpendicular to the propagation direction of the light beam, and wherein the sides of the cross section have a relative proportion higher than 1:5, preferably higher than 1:10, more preferably higher than 1:50.

12. The imaging system of claim 1, wherein the first optical waveguide comprises a first diffraction grating, the first diffraction grating being a series of diffracting gratings and wherein the outcoupling surface comprises a series of outcoupling diffraction gratings, the outcoupling diffraction gratings being arranged to cooperate with the first diffraction grating.

13. The imaging system of claim 1, wherein the optical waveguide is substantially flexible.

14. An imaging system for providing an image of a surface portion of an object, the system comprising:
- a light source arranged to provide a light beam;
- at least a first and a second optical, substantially parallel, waveguides, the first optical waveguide having a first face to the side of the light source, and having a second face opposite to the first face, the second optical waveguide having a third face and having a fourth face opposite to the third face, the first face comprising an incoupling surface, the second optical waveguide comprising an outcoupling surface;
- a first diffraction grating arranged on the first optical waveguide;
- a second diffraction grating arranged on the second optical waveguide;
- an imaging subsystem arranged to face the outcoupling surface, the imaging subsystem being arranged to the side of the second optical waveguide opposite to the light source;

wherein:
- the incoupling surface is arranged to receive light provided by the light source and incouple a portion of the received light into the first optical waveguide, the portion being transmitted in the optical waveguide by multiple total reflections in a first direction;
- the first diffraction grating is arranged to outcouple at least a fraction of the portion, the fraction being defined as outcoupled light, the first diffraction grating being further arranged to define an illumination area at a distance D from the first diffraction grating, the distance D being smaller than 1000 mm, the first diffraction grating being arranged to direct the outcoupled light to illuminate a surface portion of the object positioned at the illumination area;
- the second diffraction grating being further arranged to receive a part of the outcoupled light reflected by the surface portion;
- the second diffraction grating is further arranged to couple into the second optical waveguide at least a fraction of the part in a second direction, being substantially parallel and opposite to the first direction, the fraction of the part defining a returned light beam and being transmitted in the second optical waveguide by multiple total reflections;
- the outcoupling surface is further arranged to couple out of the second optical waveguide an outcoupled fraction of the returned light beam, the outcoupled fraction being directed to the imaging subsystem facing the outcoupling surface; and
- the imaging subsystem is arranged to provide an image of the surface portion of the object.

15. The imaging system of claim 14, wherein at least a second redirecting structure is arranged on the second optical waveguide.

16. The imaging system of claim 14, wherein:
- the first optical waveguide comprises a third optical waveguide arranged to the first optical waveguide, to the side of the light source, the third optical waveguide comprising at least a fourth diffraction grating and a second outcoupling surface;
- the third optical waveguide comprising a second imaging subsystem arranged to the second outcoupling surface, the second imaging subsystem being arranged to provide an image of a portion of the surface of a further object facing the fourth diffraction grating; and
- the first optical waveguide comprising a first and a third diffraction grating facing, respectively, at least partially the second and the fourth diffraction grating.

* * * * *